United States Patent
Abuelsaad et al.

(10) Patent No.: US 9,781,020 B2
(45) Date of Patent: *Oct. 3, 2017

(54) DEPLOYING APPLICATIONS IN A NETWORKED COMPUTING ENVIRONMENT

(71) Applicant: International Business Machines Corporation, Armonk, NY (US)

(72) Inventors: Kelly Abuelsaad, Somers, NY (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,803

(22) Filed: May 25, 2016

(65) Prior Publication Data

US 2016/0269257 A1    Sep. 15, 2016

Related U.S. Application Data

(63) Continuation of application No. 14/189,051, filed on Feb. 25, 2014, now Pat. No. 9,413,818.

(51) Int. Cl.
*G06F 15/173* (2006.01)
*H04L 12/26* (2006.01)
(Continued)

(52) U.S. Cl.
CPC .............. *H04L 43/08* (2013.01); *H04L 41/04* (2013.01); *H04L 41/0883* (2013.01);
(Continued)

(58) Field of Classification Search
CPC ... H04L 41/0883; H04L 41/145; H04L 43/08; H04L 67/10; H04L 41/04; H04L 67/32; H04L 67/34
See application file for complete search history.

(56) References Cited

U.S. PATENT DOCUMENTS 7,979,520 B2   7/2011   Hardwick et al.
8,250,135 B2   8/2012   Driesen et al.
(Continued)

OTHER PUBLICATIONS

IBM, "Tivoli Application Dependency Discovery Manager", http://www-01.ibm.com/software/tivoli/products/taddm/, Date Printed Feb. 7, 2013, 2 pages.

(Continued)

*Primary Examiner* — Mohamed Wasel
(74) *Attorney, Agent, or Firm* — William H. Hartwell; Hunter E. Webb; Keohane & D'Alessandro PLLC

(57) ABSTRACT

An approach for deploying and managing applications in a networked computing environment (e.g., a cloud computing environment). A user uploads an application for deployment in the networked computing environment. Metadata of the application is analyzed and compared to metadata of previously deployed applications. Using the comparison, a set of architectures used in conjunction with previously deployed application(s) with similar platform and middleware requirements are presented to a user. The user can select an architecture for deploying the application. The application is continuously monitored after deployment, and alternative architectures to improve the application can be presented to the user, if desired.

20 Claims, 6 Drawing Sheets

(51) Int. Cl.
*H04L 29/08* (2006.01)
*H04L 12/24* (2006.01)
(52) U.S. Cl.
CPC ............ *H04L 41/145* (2013.01); *H04L 67/10* (2013.01); *H04L 67/32* (2013.01); *H04L 67/34* (2013.01)

(56) References Cited

U.S. PATENT DOCUMENTS

| | | | |
|---|---|---|---|
| 8,402,086 B2 | 3/2013 | Driesen et al. | |
| 8,707,292 B2* | 4/2014 | Little | G06F 8/65 717/172 |
| 2005/0267928 A1* | 12/2005 | Anderson | H04L 41/28 709/200 |
| 2006/0253848 A1* | 11/2006 | Mathieu | G06F 8/61 717/168 |
| 2007/0074148 A1* | 3/2007 | Morgan | G06Q 10/06 717/101 |
| 2010/0332629 A1 | 12/2010 | Cotugno et al. | |
| 2011/0265164 A1 | 10/2011 | Lucovsky et al. | |
| 2011/0295986 A1 | 12/2011 | Ferris et al. | |
| 2012/0016992 A1 | 1/2012 | Weber et al. | |
| 2012/0131161 A1* | 5/2012 | Ferris | G06Q 30/02 709/223 |
| 2012/0198218 A1* | 8/2012 | Tukol | H04L 67/125 713/1 |
| 2012/0198344 A1* | 8/2012 | Tukol | G06F 9/44505 715/735 |
| 2012/0311135 A1 | 12/2012 | DeLuca et al. | |
| 2013/0031551 A1* | 1/2013 | Agarwal | G06F 9/5072 718/1 |
| 2013/0086224 A1* | 4/2013 | Teraguchi | G06F 17/30312 709/219 |
| 2014/0068053 A1* | 3/2014 | Ravi | G06F 9/5072 709/224 |
| 2014/0143284 A1* | 5/2014 | McCaffrey | G06F 17/30297 707/803 |
| 2015/0244596 A1 | 8/2015 | Abuelsaad et al. | |

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

Mell, P. et al., "The NIST Definition of Cloud Computing", National Institute of Standards and Technology, Information Technology Laboratory, Version 15, Oct. 7, 2009, 2 pages.

Mohamed A. Wasel, USPTO Office Action, U.S. Appl. No. 14/189,051, Notification Date Oct. 15, 2015, 16 pages.

Mohamed A. Wasel, USPTO Notice of Allowance and Fee(s) Due, U.S. Appl. No. 14/189,051, Date Mailed May 4, 2016, 7 pages.

* cited by examiner

DEPLOYING APPLICATIONS IN A NETWORKED COMPUTING ENVIRONMENT

RELATED U.S. APPLICATION DATA

The present patent document is a continuation of U.S. patent application Ser. No. 14/189,051, filed Feb. 25, 2014, entitled "DEPLOYING APPLICATIONS IN A NETWORKED COMPUTING ENVIRONMENT", the entire contents of which is incorporated herein by reference.

TECHNICAL FIELD

In general, embodiments of the present invention relate to deploying applications. Specifically, embodiments of the present invention relate to an approach for deploying and managing applications in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

In deploying applications in a cloud computing environment, there are often numerous options available to users. However, it can sometimes be a challenge and/or time-consuming task to determine the best and/or most effective architecture for an application that will meet all of the anticipated platform and middleware requirements.

SUMMARY

In general, an approach for deploying and managing applications in a networked computing environment (e.g., a cloud computing environment) is provided. In an embodiment, a user uploads an application for deployment in the networked computing environment. Metadata of the application is analyzed and compared to metadata of previously deployed applications. Using the comparison, a set of architectures used in conjunction with previously deployed application(s) with similar platform and middleware requirements are presented to a user. The user can select an architecture for deploying the application. The application is continuously monitored after deployment, and alternative architectures to improve the application can be presented to the user, if desired.

A first aspect of the present invention provides a method for deploying and managing applications in a networked computing environment, the method comprising the computer-implemented processes of: analyzing metadata in an application uploaded for deployment within the networked computing environment; comparing the metadata with metadata for previously deployed applications within the networked computing environment; presenting a user with a set of proposed architectures for deploying the uploaded application; and deploying the uploaded application according to an architecture selected by the user, wherein the architecture corresponds to at least one of the set of proposed architectures.

A second aspect of the present invention provides a system for deploying and managing applications in a networked computing environment, comprising: a memory medium comprising instructions; a bus coupled to the memory medium; and a processor coupled to the bus that when executing the instructions causes the system to: analyze metadata in an application uploaded for deployment within the networked computing environment; compare the metadata with metadata for previously deployed applications within the networked computing environment; present a user with a set of proposed architectures for deploying the uploaded application; and deploy the uploaded application according to an architecture selected by the user, wherein the architecture corresponds to at least one of the set of proposed architectures.

A third aspect of the present invention provides a computer program product for deploying and managing applications in a cloud computing environment, the computer program product comprising a computer readable storage media, and program instructions stored on the computer readable storage media, that cause at least one computer device to: analyze metadata in an application uploaded for deployment within the networked computing environment; compare the metadata with metadata for previously deployed applications within the networked computing environment; present a user with a set of proposed architectures for deploying the uploaded application; and deploy the uploaded application according to an architecture selected by the user, wherein the architecture corresponds to at least one of the set of proposed architectures.

A fourth aspect of the present invention provides a method for deploying a system for deploying and managing applications in a networked computing environment, comprising: providing a computer infrastructure having at least one computer device that operates to: analyze metadata in an application uploaded for deployment within the networked computing environment; compare the metadata with metadata for previously deployed applications within the networked computing environment; present a user with a set of proposed architectures for deploying the uploaded application; and deploy the uploaded application according to an architecture selected by the user, wherein the architecture corresponds to at least one of the set of proposed architectures.

BRIEF DESCRIPTION OF THE DRAWINGS

These and other features of this invention will be more readily understood from the following detailed description of the various aspects of the invention taken in conjunction with the accompanying drawings in which.

Figure 1:
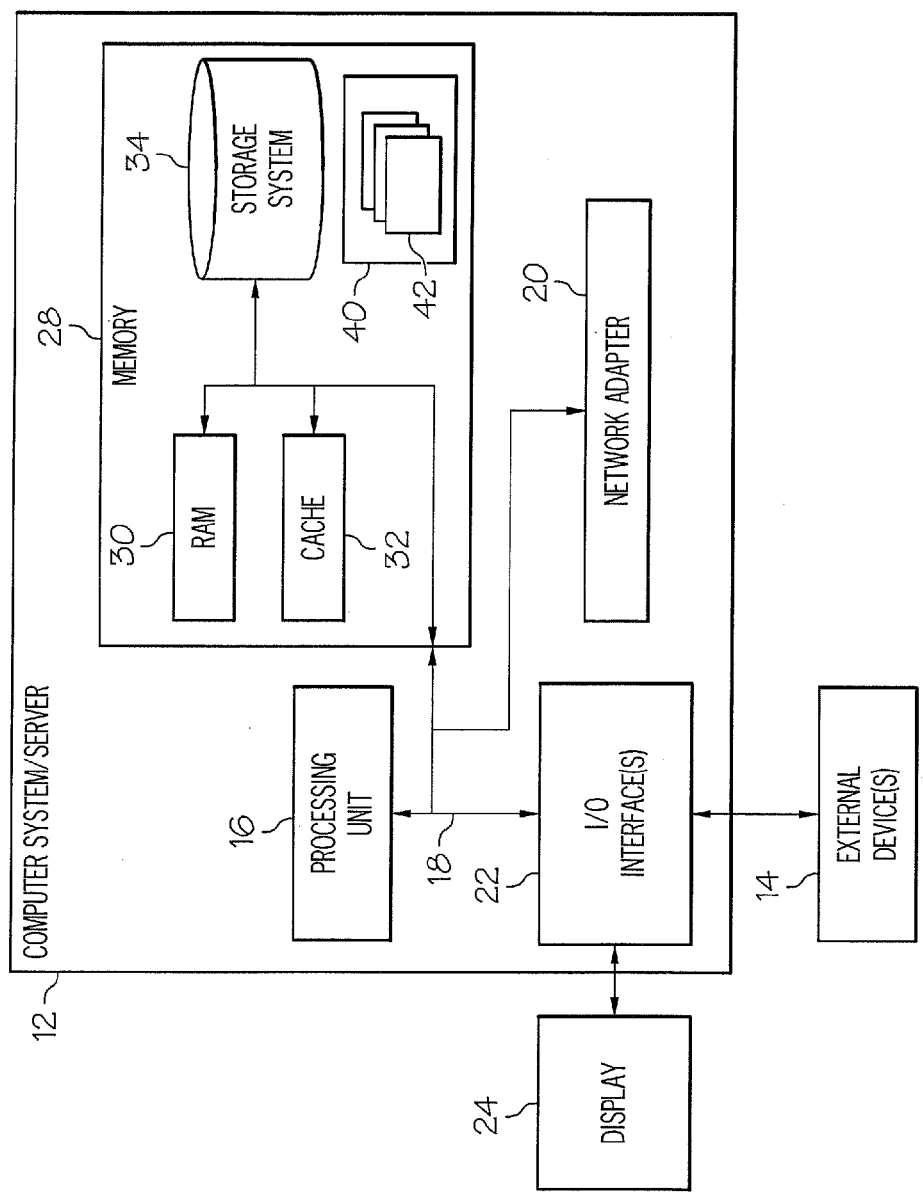
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for deploying and managing applications in a networked computing environment (e.g., a cloud computing environment). In an embodiment, a user uploads an application for deployment in the networked computing environment. Metadata of the application is analyzed and compared to previously deployed applications. Using the metadata, a plurality of architectures used in conjunction with previously deployed application(s) with similar platform and middleware requirements are presented to a user. The user can select an architecture for deploying the application. The application is continuously monitored after deployment, and alternative architectures to improve the application can be presented to the user, if desired.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
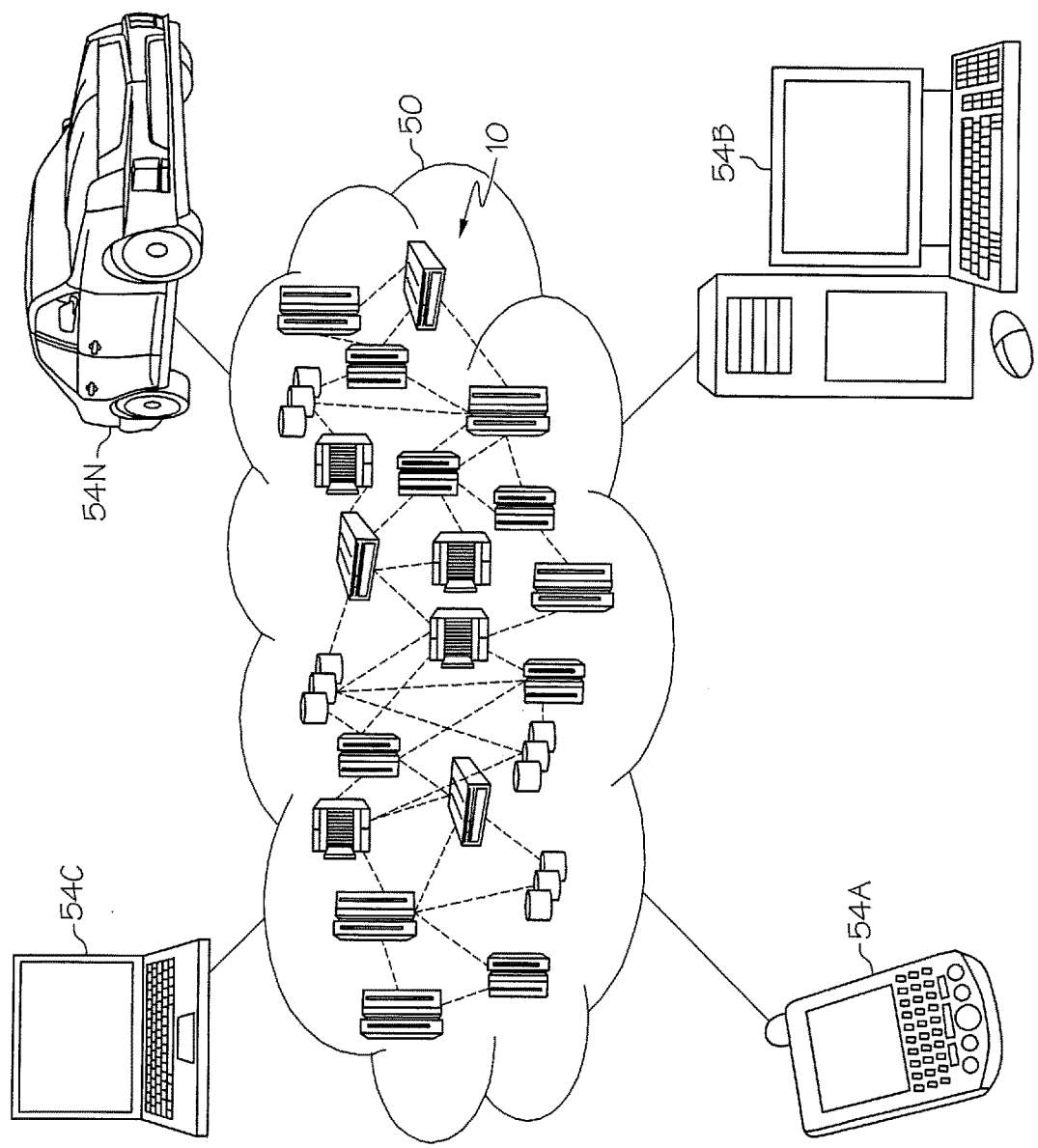
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
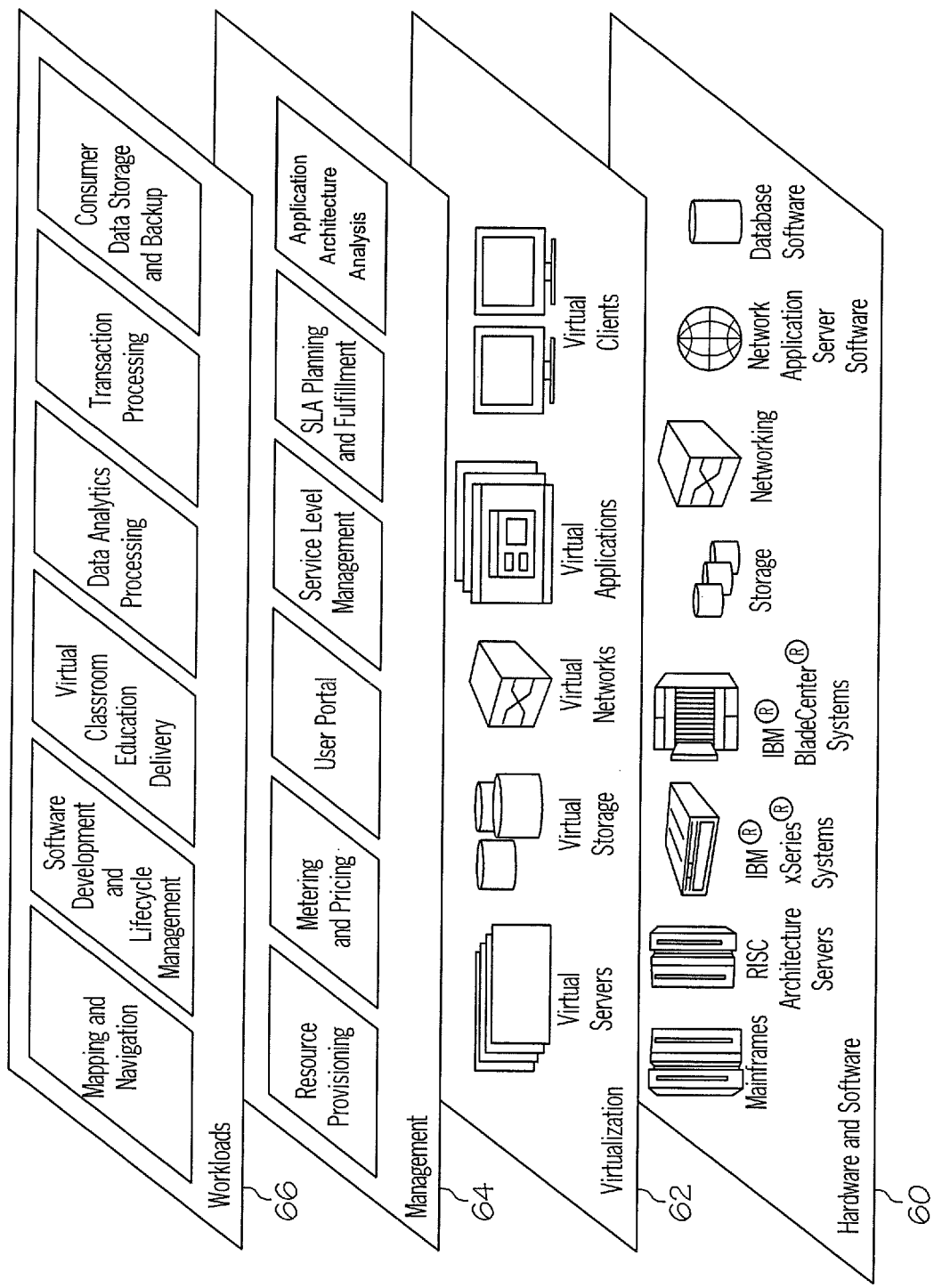
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is application architecture analysis, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; consumer data storage and backup. As mentioned above, all of the foregoing examples described with respect to FIG. 3 are illustrative only, and the invention is not limited to these examples.

It is understood that all functions of the present invention as described herein typically may be performed by the application architecture analysis functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
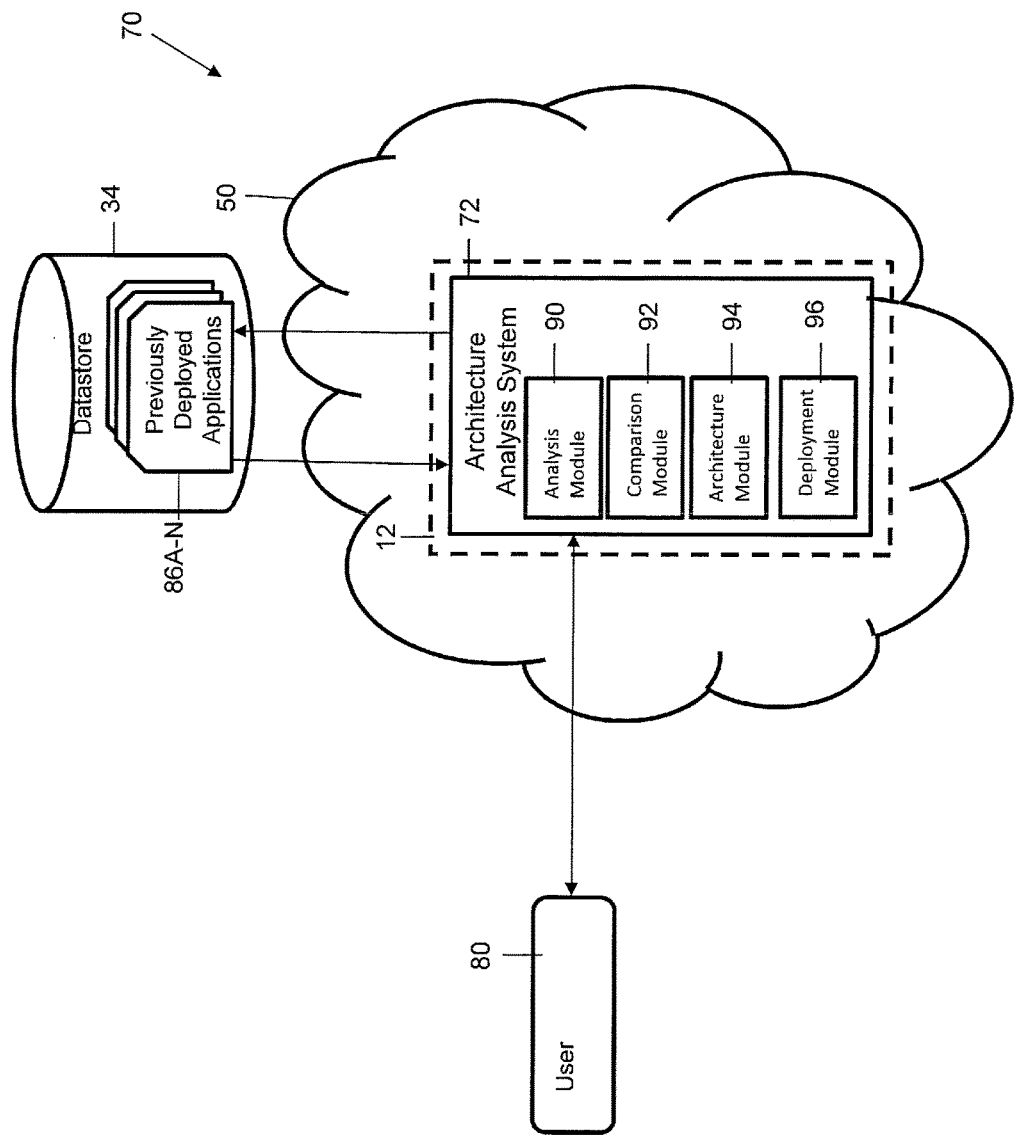
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each client need not have an architecture analysis system (hereinafter "system 72"). Rather, system 72 could be loaded on a server or server-capable device that communicates (e.g., wirelessly) with the clients to provide device protection therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for clarity.

Along these lines, system 72 may perform multiple functions similar to a general-purpose computer. Specifically, among other functions, system 72 can deploy and manage applications executing in networked computing environment 70. To accomplish this, system 72 can include: an analysis module 90, a comparison module 92, an architecture module 94, and a deployment module 96.

Network computing environment 70 includes a datastore 34 for storing metadata 86A-N for a plurality of previously deployed applications. Analysis module 90 of system 72, as executed by computer system/server 12, is configured to gather data about applications that have been previously deployed in the networking computing environment 70, such as virtual machines (VMs), middleware, software application, virtual appliances, IaaS, PaaS, or SaaS instances, and/or the like. For previously deployed applications, analysis module 90 can detect relationships between the components of the architecture to determine how each of the components work together to form a cohesive environment using any solution. For example, the analysis module 90 can detect a web server with one or more applications running within it. The analysis module 90 can obtain additional information regarding each application (e.g., that the application is running on a cluster of the same type of web servers, is connected to a remote database, and/or the like). The analysis module 90 can also obtain additional information regarding the resources used by the application (e.g., that the remote database is running on a cloud's relational database service, that the database instance has scaling options and high availability/failover options enabled, and/or the like). However, it is understood that this information is only illustrative of various information that the analysis module 90 can obtain for an application and its environment. Regardless, the analysis module 90 can store the data for each application and the corresponding resources as metadata 86A-N.

Analysis module 90 can also collect data regarding the non-functional characteristics of previously deployed applications and the respective architectures. For example, analysis module 90 can gather information regarding the price for each component of the architecture (e.g., price of the web cluster, price of a database service, and/or the like), the amount of "uptime" for the component (e.g., uptime of a whole web cluster if one member goes down, the number of application "crashes," which can be obtained from log activity and/or change record activities, and/or the like), the relative performance (e.g., average time for database queries, average response time for web applications, and/or the like), the number of concurrent users (e.g., concurrent users weighed against performance, uptime metrics, and/or the like), the characteristics of the user 80 deploying the application (e.g., associated with particular business entity, the individual's role, such as tester, developer, production support, and the like), and/or the like.

Information on the user 80 can be provided by the user 80 and/or obtained from one or more external sources, such as social network data. The analysis module 90 can distinguish between different types of environments (e.g., development/test versus production) as each environment will have different expected characteristics. The analysis module 90 can store this data as metadata 86A-N for use in determining possible architectures for deploying later uploaded applications. The analysis module 90 can categorize the data for each application architecture according to one or more characteristics (e.g., type of application, deployment architecture of the application, and/or the like). Additionally, the analysis module 90 can rank the data for each application architecture (e.g., category of application architecture) according to a plurality of attributes, such as cost, performance, popularity, and/or the like.

When an application is uploaded for deployment in the cloud computing environment 50, analysis module 90 of system 72, as executed by computer system/server 12, is configured to analyze metadata in the uploaded application. The uploaded application can include one or more of any type of deployable file, such as a Web application Archive (WAR) file, an Enterprise Archive (EAR) file, a Java Archive (JAR) file, and/or the like. The analysis module 90 can analyze descriptor metadata included in the deployable file(s). Descriptor metadata can include an application name, an application version, a resource type that the application uses, and/or a resource value that the application uses. Analysis module 90 can also analyze what programming language(s) are used to determine what type of runtime containers can be used to run the application, any specifications the application has for connecting platform components (e.g., messaging systems, Email/SMTP, database connections, and/or user directories, such as Lightweight Directory Access Protocol (LDAP) directories, and/or other repositories), and whether a multi-tier architecture is needed that requires the use of a message queue (MQ), databases (DB), and/or an active directory (AD). Furthermore, analysis module 90 can look at whether the application is for testing, development, or production. Analysis module 90 also can determine what platform and middleware components are required for the uploaded application.

Turning again to FIG. 4, comparison module 92 of system 72, as executed by computer system/server 12, is configured to compare the metadata, acquired by analysis module 90, for the application to be deployed with the architectures of previously deployed applications 86A-N stored in datastore 34. Comparison module 92 determines which architectures meet the requirements for the uploaded application, based on previously deployed applications 86A-N using any solution. For example, the comparison module 92 can compare the metadata for the application being deployed with the stored metadata for previously deployed applications 86A-N and identify the application(s) most closely matching (e.g., those application(s) that utilize the same types of components as the application being deployed). For example, the comparison module 92 can identify the applications having the most attributes (including components) in common with the application being deployed. Furthermore, the comparison module 92 can rank certain attributes as more/less significant than other attributes when identifying the most relevant previously deployed applications 86A-N. For example, a previously deployed application that has the same name but a different version and/or environment type can be a higher match than other applications 86A-N having a different name, provided by a different entity, and/or the like.

Architecture module 94 of system 72, as executed by computer system/server 12, is configured to present to user 80 the plurality of architectures that are possible for the uploaded application based on the similar previously deployed applications 86A-N as identified by the comparison module 92. Architecture module 94 can categorize the plurality of architectures by one or more of a plurality of attributes, which can be selected by the user 80. For example, the attributes can include the architecture with the lowest cost, the most expandable architecture, the best performance, the most reliable, the most popular by organization, the most popular by user's 80 job role, and/or the like. The architecture module 94 can obtain an architecture selected by the user 80. For example, the architecture can correspond to one of the plurality of architectures presented to the user 80. Furthermore, the selected architecture can have one or more of attributes of a selected one of the plurality of architectures altered by the user 80. Alternatively, the user 80 can use the various architectures to configure a new architecture for use with the application being deployed.

Turning again to FIG. 4, deployment module 96 of system 72, as executed by computer system/server 12, is configured to deploy the application to the cloud computing environment 50 using an architecture that is selected by the user 80 using any known solution. Once the application is deployed, analysis module 90 can continuously monitor a plurality of operational metrics for the application and analyze the performance of the deployed application as described herein. Further, the analysis module 90 can obtain data from a user 80 regarding how the user 80 rates the performance of the application architecture for the application. Analysis module 90 can monitor performance, availability, traffic history data, I/O and other server usage data, the number of nodes for the multi-tier architecture, the type of middleware used, and/or the like. Analysis module 90 can also gather data about relationships between components of the application to determine how each of the components work together to form a cohesive environment. Non-functional characteristics, such as the price of each component of an architecture, the number of crashes of the application, the average time for database queries, the number of concurrent users for the application, and the characteristics of the user 80 (e.g., a tester, a developer, or a production support personnel) deploying the application can be detected and monitored by analysis module 90. This information is stored in datastore 34 as a previously deployed application and can be used by comparison module 92 for later uploaded application for deployment.

In an embodiment, after deployment, the architecture analysis system 72 can present one or more alternative architectures to the user 80 for use in conjunction with a previously deployed application. To this extent, if the application architecture is not performing optimally for the user 80, the system 72 can present one or more alternative architectures, one of which can be selected by user 80. For example, analysis module 90 can monitor whether a performance characteristic of the application falls below a criteria (e.g., performance, reliability, and/or the like). Additionally, the user 80 can provide data corresponding to how the user 80 rates one or more attributes of the application in the architecture (e.g., performance, reliability, price, and/or the like). In response to a low rating, the comparison module 92 can determine how other previously deployed applications 86A-N addressed a similar issue. Architecture module 94 can present at least one alternative architecture to the user 80 to select in order to address the issue for the deployed application. Such information can include data corresponding to how the alternative architecture will address the issue and/or selection of the alternative architecture will affect one or more other characteristics of the application (e.g., price, performance, etc.). In response, the user 80 can elect to make one or more changes to the architecture for the application and/or keep the current architecture.

Figure 5:
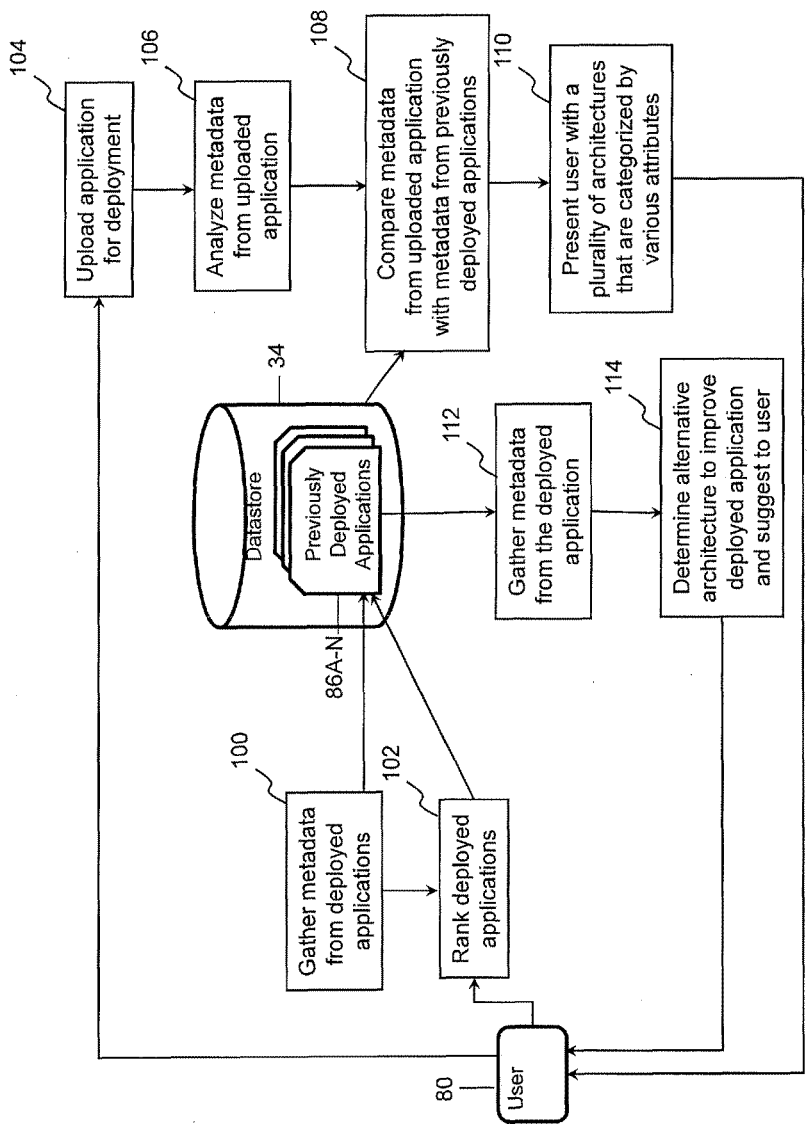
FIG. 5 depicts an example flow diagram according to an embodiment of the present invention.

Referring now to FIG. 5, an example flow diagram according to an embodiment of the present invention is shown, which can be implemented by system 72 (FIG. 4), as executed by computer system/server 12 (FIG. 4). At function block 100, metadata 86A-N is gathered from deployed applications within the network computing environment 70 (FIG. 4) and stored in datastore 34. As mentioned herein, metadata 86A-N includes data regarding the artifacts that have been deployed, relationship between components, non-functional characteristics, and/or the like. One or more users 80 can rank each of the plurality of deployed applications at function block 102. Alternatively, each of the plurality of deployed applications can be ranked according to their characteristics. For example, deployed applications can be ranked by a type of application (e.g., a web application running on a web server, or a relational database), a deployment architecture of the application (e.g., cluster vs. standalone, managed service vs. manually installed middleware), a reliability and/or uptime, a performance relative to usage, a cost, and/or the like.

At function block 104, a user 80 can upload an application to the network computing environment 70 (FIG. 4) for deployment. Metadata from the uploaded application can be gathered and analyzed, at function block 106. At function block 108, this metadata can be compared to the metadata 86A-N that was gathered from previously deployed applications. Based on this comparison, the user 80 is presented, at function block 110, with a plurality of architectures for deploying the uploaded application. The plurality of architectures can be categorized according to a plurality of attributes. The plurality of attributes can correspond to the ranking of each previously deployed architecture. For example, as mentioned herein, each of the plurality of architectures presented to the user 80 can be ranked by a cost, a performance, a reliability, and/or the like.

At function block 112, after the uploaded application is deployed according to the architecture selected by the user 80, metadata is gathered regarding the performance of the deployed application. If the application is not performing according to a preset criteria, at function block 114, an alternative architecture can be presented to the user 80 to improve the application.

Figure 6:
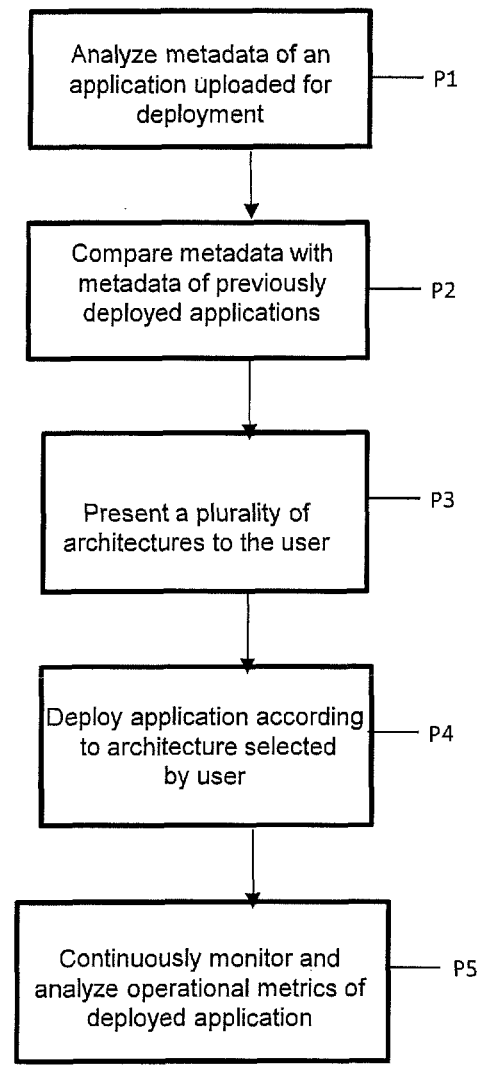
FIG. 6 depicts an example process flow according to an embodiment of the present invention.

Referring now to FIG. 6, a method flow according to an embodiment of the present invention is shown. At P1, analysis module 90 of system 72, as executed by computer system/server 12, analyzes metadata in an application uploaded for deployment in a networked computing environment. At P2, comparison module 92 of system 72, as executed by computer system/server 12, compares the metadata with previously deployed applications to determine a plurality of architectures that meet the requirements of the uploaded application. At P3, architecture module 94, presents a user 80 (FIG. 4), based on the comparing, with the plurality of architectures for deploying the application. At P4, deployment 96 of system 72, as executed by computer system/server 12, deploys the application according to the architecture selected by the user 80 (FIG. 4). At P5, analysis module 90 of system 72, as executed by computer system/server 12, can continually analyze metadata, such as operational metrics, of the deployed application. If an operational metric falls below a required threshold, comparison module 92 can compare the metadata with previously deployed applications to determine an alternative architecture for the uploaded application. Furthermore, the metadata of the deployed application can be stored for later uploaded applications.

The flow of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for deploying and managing applications in a networked computing environment, it is understood that the invention further provides various alternative embodiments. For example, in one embodiment, the invention provides a computer-readable/useable medium that includes computer program code to enable a computer infrastructure to deploying and managing applications, as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide functionality for deploying and managing applications. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for deploying and managing applications in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for deploying and managing applications in a networked computing environment, the method comprising the computer-implemented processes of:
   analyzing metadata in an application uploaded for deployment within the networked computing environment;
   comparing the uploaded application metadata with previously deployed application metadata of other user applications that have previously been deployed within the networked computing environment;
   selecting a proposed architecture for deploying the uploaded application from a set of proposed architectures based upon the comparing; and
   deploying the uploaded application according to the proposed architecture selected.

2. The method of claim 1, the method further comprising:
   monitoring a plurality of operational metrics for the deployed application.

3. The method of claim 2, the method further comprising:
   comparing the plurality of operational metrics for the deployed application with previously deployed applications within the networked computing environment; and
   presenting the user with at least one alternative architecture to improve the deployed application.

4. The method of claim 1, wherein the plurality of architectures presented to the user are categorized by a plurality of attributes.

5. The method of claim 1, wherein analyzing the metadata includes detecting required platform and middleware components required to deploy the uploaded application.

6. The method of claim 5, wherein the plurality of architectures presented to the user are architectures of previously deployed applications with similar platform and middleware component requirements.

7. The method of claim 1, wherein the networked computing environment is a cloud computing environment and wherein the application is a cloud resource.

8. A system for deploying and managing applications in a networked computing environment, comprising:
   a memory medium comprising instructions;
   a bus coupled to the memory medium; and a processor coupled to the bus that when executing the instructions causes the system to:

analyze metadata in an application uploaded for deployment within the networked computing environment;

compare the uploaded application metadata with previously deployed application metadata of other user applications that have previously been deployed within the networked computing environment;

select a proposed architecture for deploying the uploaded application from a set of proposed architectures based upon the comparing; and deploy the uploaded application according to the proposed architecture selected.

9. The system of claim 8, the instructions further causing the system to:

monitor a plurality of operational metrics for the deployed application.

10. The system of claim 9, the instructions further causing the system to:

compare the plurality of operational metrics for the deployed application with previously deployed applications within the networked computing environment; and present the user with at least one alternative architecture to improve the deployed application.

11. The system of claim 8, wherein the plurality of architectures presented to the user are categorized by a plurality of attributes.

12. The system of claim 8, wherein analyzing the metadata includes detecting required platform and middleware components required to deploy the uploaded application.

13. The system of claim 12, wherein the plurality of architectures presented to the user are architectures of previously deployed applications with similar platform and middleware component requirements.

14. The system of claim 8, wherein the networked computing environment is a cloud computing environment and wherein the application is a cloud resource.

15. A computer program product for deploying and managing applications in a cloud computing environment, the computer program product comprising a computer readable storage device, and program instructions stored on the computer readable storage device, that cause at least one computer device to:

analyze metadata in an application uploaded for deployment within the networked computing environment;

compare the uploaded application metadata with previously deployed application metadata of other user applications that have previously been deployed within the networked computing environment;

select a proposed architecture for deploying the uploaded application from a set of proposed architectures based upon the comparing; and deploy the uploaded application according to the proposed architecture selected.

16. The computer program product of claim 15, the instructions further causing the at least one computer device to:

monitor a plurality of operational metrics for the deployed application.

17. The computer program product of claim 16, the instructions further causing the at least one computer device to: compare the plurality of operational metrics for the deployed application with previously deployed applications within the networked computing environment; and present the user with at least one alternative architecture to improve the deployed application.

18. The computer program product of claim 15, wherein the plurality of architectures presented to the user are categorized by a plurality of attributes.

19. The computer program product of claim 15, wherein analyzing the metadata includes detecting required platform and middleware components required to deploy the uploaded application.

20. The computer program product of claim 19, wherein the plurality of architectures presented to the user are architectures of previously deployed applications with similar platform and middleware component requirements.

* * * * *